(12) United States Patent
Cross et al.

(10) Patent No.: US 7,549,148 B2
(45) Date of Patent: Jun. 16, 2009

(54) SELF-DESCRIBING SOFTWARE IMAGE UPDATE COMPONENTS

(75) Inventors: Brian D. Cross, Redmond, WA (US); Michael E. Markley, Redmond, WA (US); Lorna Rebecca McNeill, Seattle, WA (US); Jeffrey D. Glaum, Redmond, WA (US); Scott R. Shell, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 704 days.

(21) Appl. No.: 10/837,024

(22) Filed: May 1, 2004

(65) Prior Publication Data

US 2005/0132356 A1   Jun. 16, 2005

Related U.S. Application Data

(60) Provisional application No. 60/530,129, filed on Dec. 16, 2003.

(51) Int. Cl.
G06F 9/445 (2006.01)
(52) U.S. Cl. .................................... 717/174
(58) Field of Classification Search .................. 717/174
See application file for complete search history.

(56) References Cited

U.S. PATENT DOCUMENTS

| | | | |
|---|---|---|---|
| 4,974,149 A * | 11/1990 | Valenti | ........................ 709/217 |
| 5,303,384 A | 4/1994 | Rodriguez | |
| 5,421,006 A | 5/1995 | Jablon | |
| 5,625,693 A | 4/1997 | Rohatgi | |
| 5,757,914 A | 5/1998 | McManis | |
| 5,835,777 A | 11/1998 | Staelin | |
| 6,157,721 A | 12/2000 | Shear | |
| 6,243,468 B1 | 6/2001 | Pearce | |
| 6,327,652 B1 | 12/2001 | England | |
| 6,330,670 B1 | 12/2001 | England | |
| 6,381,742 B2 * | 4/2002 | Forbes et al. | ................. 717/176 |
| 6,675,382 B1 | 1/2004 | Foster | |
| 6,681,390 B2 | 1/2004 | Fiske | |
| 6,697,948 B1 | 2/2004 | Rabin | |
| 6,802,006 B1 | 10/2004 | Bodrov | |

(Continued)

FOREIGN PATENT DOCUMENTS

EP         0802480        10/1997

(Continued)

OTHER PUBLICATIONS

European Search Report in application EP 04029342 which corresponds to US Application.

(Continued)

*Primary Examiner*—Wei Y. Zhen
*Assistant Examiner*—Chih-Ching Chow
(74) *Attorney, Agent, or Firm*—Workman Nydegger

(57) ABSTRACT

Described is a system and method in which software images including updates are provided as packages. The package is self-describing, thereby facilitating the replacement of only component parts of an image. A software build process maps operating system features (comprising files, metadata, configuration information and so forth) into the packages, and executable code is processed for relocation purposes. The final package includes a device manifest file that describes the package and conveys dependency information and information about the priority of settings (shadow data).

28 Claims, 13 Drawing Sheets

U.S. PATENT DOCUMENTS

| | | | |
|---|---|---|---|
| 6,820,130 B1 | 11/2004 | Miyamoto | |
| 6,832,373 B2 * | 12/2004 | O'Neill | 717/171 |
| 6,871,344 B2 * | 3/2005 | Grier et al. | 717/162 |
| 6,912,591 B2 | 6/2005 | Lash | |
| 7,000,230 B1 * | 2/2006 | Murray et al. | 717/172 |
| 7,072,807 B2 * | 7/2006 | Brown et al. | 703/1 |
| 7,085,957 B2 | 8/2006 | Sundareson | |
| 7,117,304 B2 | 10/2006 | Sohn | |
| 7,228,541 B2 * | 6/2007 | Gupton et al. | 717/175 |
| 7,249,174 B2 | 7/2007 | Srinivasa | |
| 7,263,699 B2 | 8/2007 | Jacquemot | |
| 7,346,435 B2 | 3/2008 | Amendola | |
| 2001/0029605 A1 | 10/2001 | Forbes | |
| 2001/0044782 A1 | 11/2001 | Hughes | |
| 2002/0144248 A1 * | 10/2002 | Forbes et al. | 717/167 |
| 2003/0028766 A1 | 2/2003 | Gass | |
| 2003/0063896 A1 | 4/2003 | Gonzalez-Tovar | |
| 2003/0217358 A1 | 11/2003 | Thurston | |
| 2004/0015946 A1 | 1/2004 | Te'eni | |
| 2004/0060035 A1 * | 3/2004 | Ustaris | 717/100 |
| 2004/0250245 A1 | 12/2004 | Rao | |
| 2004/0255291 A1 * | 12/2004 | Sierer et al. | 717/174 |
| 2005/0132123 A1 | 6/2005 | Glaum | |
| 2005/0132179 A1 | 6/2005 | Glaum | |
| 2005/0132349 A1 * | 6/2005 | Roberts et al. | 717/168 |
| 2005/0132350 A1 | 6/2005 | Markley | |
| 2005/0155031 A1 * | 7/2005 | Wang et al. | 717/170 |
| 2005/0203968 A1 * | 9/2005 | Dehghan et al. | 707/203 |
| 2006/0079254 A1 | 4/2006 | Hogan | |

FOREIGN PATENT DOCUMENTS

| | | |
|---|---|---|
| EP | 1164475 | 12/2001 |
| WO | WO99/26123 | 5/1999 |
| WO | WO0201332 | 1/2002 |
| WO | WO02103495 | 12/2002 |

OTHER PUBLICATIONS

Lymn, Brett; "Preventing the Unauthorised Binary" article, Copyright 2000-2002, Jan. 19, 2000 Updated Jun. 18, 2002 by Jay Fink.

Anonymous: "Method for Generating Ordered Build Dependencies" IBM Technical Disclosure Bulletin, vol. 38, No. 9, Sep. 1, 1995, p. 161.

Ottenstein et al., "The Program Dependence Graph In a Software Development Environment", ACM 1984 pp. 177-184.

Mark Alan Weiss, "Data Structures & Algorithim Analysis in C++" Second Edition, Published by Addsion Wesley, 1999, pp. 339-346, section 9.3.2 Dijkstra's Algorithim.

* cited by examiner

SELF-DESCRIBING SOFTWARE IMAGE UPDATE COMPONENTS

CROSS-REFERENCE TO RELATED APPLICATIONS

The present invention claims priority to U.S. provisional patent application Ser. No. 60/530,129 filed Dec. 16, 2003, and incorporated herein in its entirety.

The present invention is related to the following U.S. patent applications, filed concurrently herewith and incorporated herein in their entireties:

application Ser. No. 10/837,250 "Applying Custom Software Image Updates To Non-Volatile Storage in a Failsafe Manner."

application Ser. No. 10/837,176 "Determining the Maximal Set of Dependent Software Updates Valid for Installation."

application Ser. No. 10/837,151 "Ensuring that a Software Update may be Installed or Run only on a Specific Device or Class of Devices."

application Ser. No. 10/837,150 "Creating File Systems Within a File In a Storage Technology-Abstracted Manner."

FIELD OF THE INVENTION

The invention relates generally to computing devices, and more particularly to updating non-volatile storage of computing devices.

BACKGROUND

Mobile computing devices such as personal digital assistants, contemporary mobile telephones, and hand-held and pocket-sized computers are becoming important and popular user tools. In general, they have become small enough to be extremely convenient, while consuming less battery power, and at the same time have become capable of running more powerful applications.

During the process of manufacturing such devices, embedded operating system images are typically built into a monolithic image file and stored in non-volatile storage (e.g., NAND or NOR flash memory, a hard disk and so forth) of each device. As a result, updating such a device is necessary or desirable from time-to-time.

However, a monolithic operating system has a number of disadvantages, including that to install an update, a large amount of resources (e.g., temporary storage and bandwidth) are needed to replace the entire monolithic image. At the same time, installing some subset components of the operating system is a difficult task, for various reasons. What is needed are mechanisms that facilitate the updating of some subset of an operating system image.

SUMMARY OF THE INVENTION

Briefly, the present invention is directed towards a system and method that provide installation and update packages, wherein each package comprises an encapsulation of a set of files that which are treated the same for the purposes of installation, and wherein the format of the package is self-describing, thereby facilitating the replacement of only component parts of an image. To this end, the system and method maps operating system features (comprising files, metadata, configuration information and so forth) into packages as part of a software build process.

In one implementation, packaging logic handles cases where specific files and/or settings are shared between related features, which the user in turn chooses to map to differing packages. The logic generally ensures that individual files/settings are mapped to the correct package, given a number of possible higher level package mapping requests. Further, packages optionally convey dependency information, and thus a mechanism is provided (via feature-level dependency specifications) by which packages acquire the dependency information. Logic resolves conflicts and dependencies below the feature level.

During the build process, a build manifest file is created by taking a binary image builder file for the operating system image and a component to package mapping file as inputs. The build manifest file specifies the file contents for a particular package. These file contents are reviewed, and any executable code is processed prior to insertion into the package to enable executable code relocation/fix-up on the device at install time. A package generation process creates the device manifest based on information in the build manifest and a package definition file.

The registry for the operating system image is broken up and assigned to packages based on a similar algorithm, and XML files may be similarly broken up and assigned to specific packages. The result is a number of files for each package that is to be constructed, possibly including a package definition file, a component mapping file, a component relations file, a build manifest file; registry file and an XML settings file. From these files a package generation process constructs a final package file by creating a package collection from the packages, including mapping each package to the package definition, reading the build manifest file for that package and generating the package from that data.

For a package to be self-describing, a device manifest file is created during the packaging process and stored in the package itself. The device manifest file is used during the installation process. Package dependency and shadow (package settings priority) data is also part of the data accompanying a package, e.g., by writing it into the device manifest file.

Other advantages will become apparent from the following detailed description when taken in conjunction with the drawings, in which:

DETAILED DESCRIPTION

Exemplary Operating Environment

Figure 1:
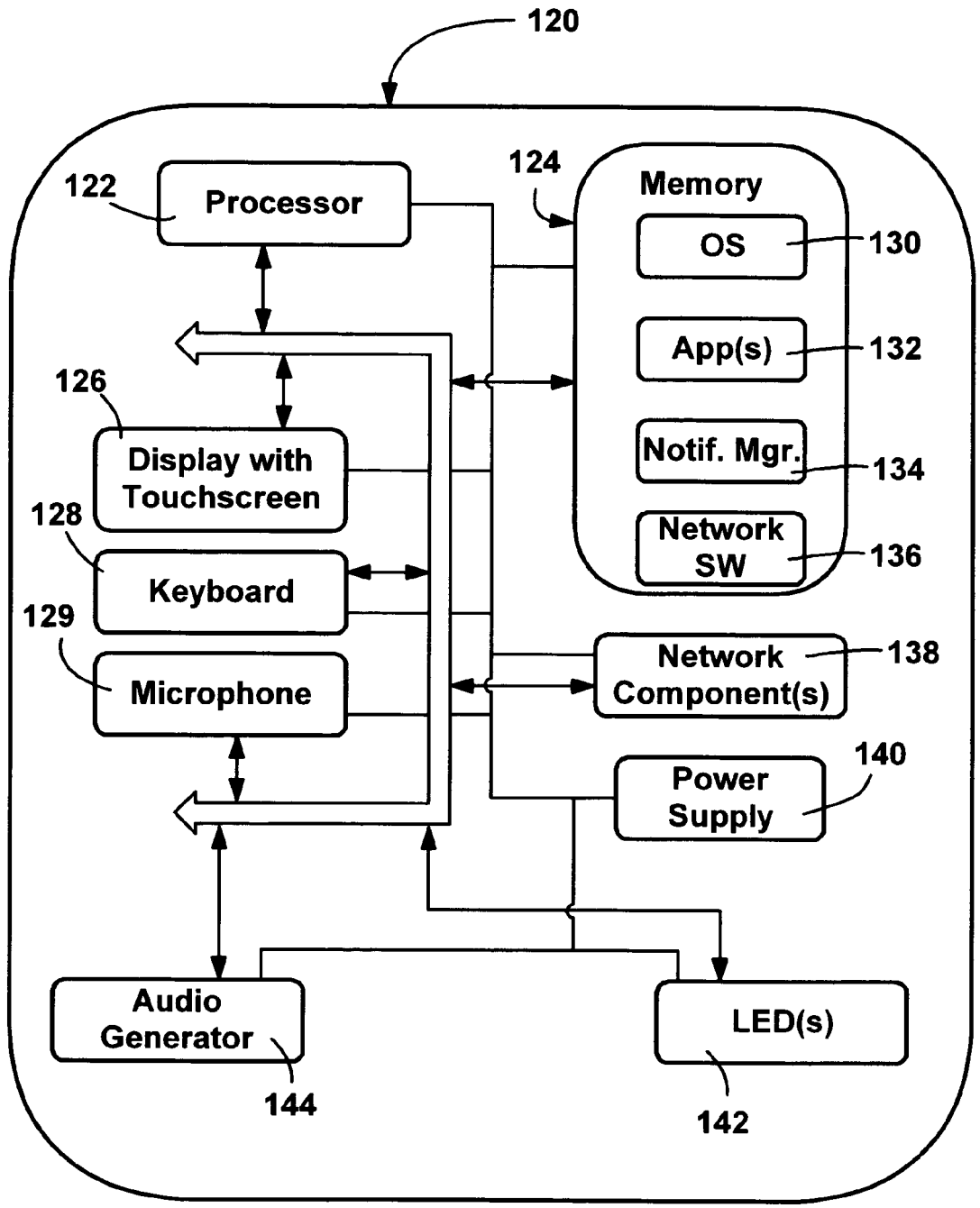
FIG. 1 is a block diagram generally representing a computer system into which the present invention may be incorporated.

FIG. 1 shows functional components of one such handheld computing device 120, including a processor 122, a memory 124, a display 126, and a keyboard 128 (which may be a physical or virtual keyboard, or may represent both). A microphone 129 may be present to receive audio input. The memory 124 generally includes both volatile memory (e.g., RAM) and non-volatile memory (e.g., ROM, PCMCIA cards, and so forth). An operating system 130 is resident in the memory 124 and executes on the processor 122, such as the Windows® operating system from Microsoft Corporation, or another operating system.

One or more application programs 132 are loaded into memory 124 (or execute in place in ROM) and run on the operating system 130. Examples of applications include email programs, scheduling programs, PIM (personal information management) programs, word processing programs, spreadsheet programs, Internet browser programs, and so forth. The handheld personal computer 120 may also include a notification manager 134 loaded in the memory 124, which executes on the processor 122. The notification manager 134 handles notification requests, e.g., from the application programs 132. Also, as described below, the handheld personal computer 120 includes networking software 136 (e.g., hardware drivers and the like) and network components 138 (e.g., a radio and antenna) suitable for connecting the handheld personal computer 120 to a network, which may include making a telephone call.

The handheld personal computer 120 has a power supply 140, which is implemented as one or more batteries. The power supply 140 may further include an external power source that overrides or recharges the built-in batteries, such as an AC adapter or a powered docking cradle.

The exemplary handheld personal computer 120 represented in FIG. 1 is shown with three types of external notification mechanisms: one or more light emitting diodes (LEDs) 142 and an audio generator 144. These devices may be directly coupled to the power supply 140 so that when activated, they remain on for a duration dictated by a notification mechanism even though the handheld personal computer processor 122 and other components might shut down to conserve battery power. The LED 142 preferably remains on indefinitely until the user takes action. Note that contemporary versions of the audio generator 144 use too much power for today's handheld personal computer batteries, and so it is configured to turn off when the rest of the system does or at some finite duration after activation.

Note that although a basic handheld personal computer has been shown, virtually any device capable of receiving data communications and processing the data in some way for use by a program, such as a mobile telephone, is equivalent for purposes of implementing the present invention.

Self-Describing Software Image Update Components

The present invention is generally directed towards installing and/or updating software that is stored on small mobile computing devices, such as Microsoft Windows® CE-based portable devices, including those in which the initial software or software update is written to the embedded device's non-volatile memory, e.g., flash memory. Notwithstanding, the present invention provides benefits to computing in general, and thus may apply to other computing devices and other types of storage, including various types of memory and/or other types of storage media such as hard disk drives. For purposes of simplicity, the term "flash" hereinafter may be used with reference to the updatable storage of a device, although it is understood that any storage mechanism is equivalent. Further, the term "image" will generally include the concept of the initial software installation image as well as subsequent software updates to an image, even when only part of an existing image is updated.

By way of background, contemporary operating systems such as the Windows® CE operating system are modular (componentized) However, the resultant image that contains the correct files and settings is a monolithic operating system image. To this end, at build time, feature variables are mapped to specific files and settings to determine what is contained in the resultant monolithic operating system image. The ability to perform this mapping makes use of two types of build-time configuration files: binary image builder (.bib) and registry (.reg) files. The .bib file contains a list of files which are to be included in the resultant image, and the reg file contains a list of registry (setting) information to be included in the image. The contents of these files are grouped into collections by feature and wrapped in conditional variables which can optionally be set at build time. When a conditional feature variable is set at build time, the associated contents of the .bib and .reg files are included in the image, and as such the user of the system has the ability to select, at a granular feature level, what the resultant image should contain.

Higher-level logic is also applied to the selection of conditional variables, such that feature-level dependencies are self-satisfying. In other words, selecting one feature will also cause other features, on which the selected feature is dependent, to be selected. The build system thus ensures that a self-consistent monolithic operating system image results from any random selection of features on the part of the user. However, as described above, a monolithic operating system image has disadvantages relative to an image comprised in which subparts of the image can be individually updated.

In accordance with an aspect of the present invention, images including software updates are built from self-contained, secure entities. A fundamental update primitive is referred to as a package, wherein in general, a package is an encapsulation of a set of files that are versioned the same and are updated as a unit. The present invention provides a package format as one which is self-describing, a significant improvement when updating images, and one that facilitates replacing only a component part of an image.

Images are built from packages and contain both executable code and data that may be applied to storage. Note that executable code is customized to the virtual address space environment of the embedded device at install time; for example, depending on the underlying flash memory technology, some devices allow executable code to be run directly from the flash (execute-in-place, which means that the code cannot be stored in a compressed format) while other devices require that the code be copied (including decompressing the code as necessary) into RAM in order to run. In keeping with an aspect of the present invention, image update technology uses packages to break the operating system image into updateable components that can be updated in isolation, while maintaining any cross-component dependencies.

In accordance with an aspect of the present invention, there is provided a system and method that maps operating system features (comprising files, metadata, configuration information and so forth) into packages as part of a software build process. The packages can be used for initial device installation, and also for updates. As described below, software update packages may be in various forms, for example some may contain only the changes (deltas) to a previous update, while others may contain files that entirely replace other files. One other type of package can contain other packages.

The package concept described herein is a component part of the updating process. The process by which operating system features (generally an abstract concept that maps to specific files, metadata, configuration information, and so forth) are mapped into packages provides an ease-of-use advantage for the user (e.g., the provider of the image), including that instead of having to identify the lowest level components of an operating system image, the user is able to refer to higher level handles that describe a full set of associated files, metadata, configuration information and so forth for a particular aspect of the operating system image. Note that as used herein, the terms "feature" and "component" ordinarily may be used interchangeably. By referring to a feature handle, the user is able to gain an advantage in terms of managing packaging complexity through abstraction. For example, rather than specifically mapping the executable module, dynamically-linked libraries (DLLs), resource/data files, registry information, and the like for browsing component software (e.g., Internet Explorer) and individually mapping each part into a package, the present invention enables the user to refer to this associated information with a single "Internet Explorer" handle and thus map it at the feature level to a package.

The present invention also provides packaging logic to handle cases where specific files/settings are shared between related features, which the user in turn chooses to map to differing packages. The logic in various algorithms (described below) generally ensures that individual files/settings are mapped to the correct package, given a number of possible higher level package mapping requests. In situations in which the logic cannot determine a correct course of action, messaging is provided to the user to indicate any issues that require user intervention to resolve.

Further, packages optionally convey dependency information. For example, when the contents of a package rely on the contents of another package, the relationship is captured during the build process and encoded into the package for later analysis during the installation process. The present invention also provides a mechanism (via feature-level dependency specifications) by which packages acquire the dependency information.

In accordance with an aspect of the present invention, feature selections can be mapped to an array (one or more) of packages, resulting in specific files and settings being mapped to an appropriate package. To accomplish this correctly, logic resolves conflicts and dependencies below the feature level. For example, if two features logically refer to the same specific file and the features are mapped to different packages, the logic determines into which package the shared file is to be placed.

In one implementation, package files are defined at build time by three different files: a package definition file (pkd), a component mapping file (cpm), and a component relations file (crf). The pkd file defines the global attributes of the contents of a package. The pkd file is an XML file that is validated during the build process against the following XSD:

```
<?xml version="1.0" encoding="utf-8" ?>
<xs:schema targetNamespace="http://tempuri.org/Packages.xsd" elementFormDefault="qualified"
    xmlns="http://tempuri.org/Packages.xsd" xmlns:mstns="http://tempuri.org/Packages.xsd"
    xmlns:xs="http://www.w3.org/2001/XMLSchema"
    xmlns:xsi="http://www.w3.org/2001/XMLSchema-instance">
    <xs:element name="PackageCollection">
        <xs:complexType>
            <xs:sequence>
                <xs:element name="Package" minOccurs="1" maxOccurs="unbounded">
                    <xs:complexType>
                        <xs:sequence>
                            <xs:element name="Name" type="xs:string" minOccurs="1" maxOccurs="1"></xs:element>
                            <xs:element name="Guid" type="xs:string" minOccurs="1" maxOccurs="1"></xs:element>
                            <xs:element name="Version" type="xs:string" minOccurs="1" maxOccurs="1"></xs:element>
                            <xs:element name="LocBuddy" type="xs:string" minOccurs="1" maxOccurs="1"></xs:element>
                            <xs:element name="CertPaths" minOccurs="0" maxOccurs="unbounded">
                                <xs:complexType>
                                    <xs:sequence>
                                        <xs:element name="path" type="xs:string"></xs:element>
                                    </xs:sequence>
                                </xs:complexType>
                            </xs:element>
                        </xs:sequence>
                    </xs:complexType>
                </xs:element>
            </xs:sequence>
        </xs:complexType>
    </xs:element>
</xs:schema>
```

One example of a .pkd file is set forth below:

```
<?xml version="1.0" encoding="utf-8"?>
<Package xmlns:xsd="http://www.w3.org/2001/XMLSchema"
xmlns:xsi="http://www.w3.org/2001/XMLSchema-instance">
    <Name>XSC1BD_OEM</Name>
    <Guid>0b3bc94d-e4c4-4509-930c-8131dde185c8</Guid>
    <Version>000000</Version>
    <LocBuddy>00000000-0000-0000-0000-000000000000</LocBuddy>
</Package>
```

Note the presence in this definition file of the globally-unique ID (GUID) and the package name. The GUID provides a unique name for the package that can be referenced to differentiate the package from another. The package name serves to provide a handle that is used when mapping an operating system feature/component to the package.

In an example implementation, the cpm file is a comma-separated value file that contains component-to-package mapping information. It is of the form:

<component variable>, <package name> or

<component filename>, <package name>.

The following provides some component-to-package mapping information examples:

```
nk.exe,XSC1BD_OEM
kd.dll,XSC1BD_OEM
CE_MODULES_FILESYS,XSC1BD_OEM
CE_MODULES_BINFS,XSC1BD_OEM
CE_MODULES_FSDMGR,XSC1BD_OEM
FILESYS_FSYSRAM,XSC1BD_OEM
FILESYS_FSREG,XSC1BD_OEM
coredll.dll,XSC1BD_OEM
fsdmgr.dll,XSC1BD_OEM
imgfs.dll,XSC1BD_OEM
CE_MODULES_STRATAD,XSC1BD_OEM
CE_MODULES_MSPART,XSC1BD_OEM
CE_MODULES_CEDDK,XSC1BD_OEM
```

The component relations file (crf) denotes dependency and shadow relations (shadow refers to a precedence ordering for settings) between components. The component relations file is of the form:

<component variable> DEPENDSON <component variable>

Or

<component variable> SHADOWS <component variable>

An example of this is:

APPS_MODULES_OMADMCLIENT SHADOWS APPS_MODULES_MMS

The following tables summarize general, non-limiting definitions for some of the terms and file types described herein:

Terms

| Term | General Definition |
| --- | --- |
| Module | A single executable file (.EXE, .DLL, etc.) |
| Settings | A collection of configuration information that may contain Registry settings, file system initialization instructions (.DAT file), Database initializations, and Provisioning XML. |
| Component | A collection of modules, files (non-module files including templates, fonts, etc.), and settings that make up a feature unit. Components are typically associated with sysgen MODULES tags. |

-continued

| Term | General Definition |
| --- | --- |
| Package | A collection of components that is signed and packaged for distribution |
| Manifest (package, build and device) | A file which describes the contents of a package. Note that in the build environment, there is a package manifest file (with a .BIB extension) that contains entries which describe the names of each file in the package; and a different manifest file, a device side manifest (with a .DSM extension), is a binary file that describes the complete set of information about a package (described below with reference to FIG. 9). As described with reference to FIG. 3, a build manifest file is created from the package manifest file, and used by a package generation process that generates the device manifest file (and the rest of the package). |
| Shadow Order Tool | Build tool which processes the Component Relationships File and generates the Package Shadow Files. |

File Types

| Exten. | File Type | General Description |
| --- | --- | --- |
| .bib | Binary image builder | Contains a list of files which should be included in the resultant image |
| .reg | registry file | file contains a list of registry (setting) information to be included in the image |
| .pkd.xml | Package Definition File | XML file in the build tree which defines what packages exist (package name, guid, version, loc buddy) |
| .cpm.csv | Component to Package Mapping file | CSV file in the build tree which maps MODULES tags and files to packages |
| .crf.csv | Component Relationships File | Text file in the build tree which defines the relationships (shadow and dependency) between MODULES tags |
| .bsm.xml | Build Side Manifest File | an XML file translation of the .bib (binary image builder) file |
| .psf | Package Shadow File | Intermediate file in the build environment (one per package, as in <packagename>.psf) which lists the packages that need to be shadowed by the named package. |
| .dsm | Device Side Manifest file | File on the device (one per package) which describes the package (files in the package, name, guid, signature, version, shadows, dependencies, CRC, root certs, etc.) |
| .pkg.cab | Canonical Package file | Full version of a package which contains the complete file for all files in the package. |
| .pku.cab | Update Package file | A file which facilitates the update of a device from a specific version of a single package to a different version of the same package. This file may contain binary diffs of individual files, or complete files, whichever minimizes the size of the update package. |
| .pks.cab | Super Package file | A file which contains a collection of Update Packages and/or Canonical Packages. |

Figure 2:
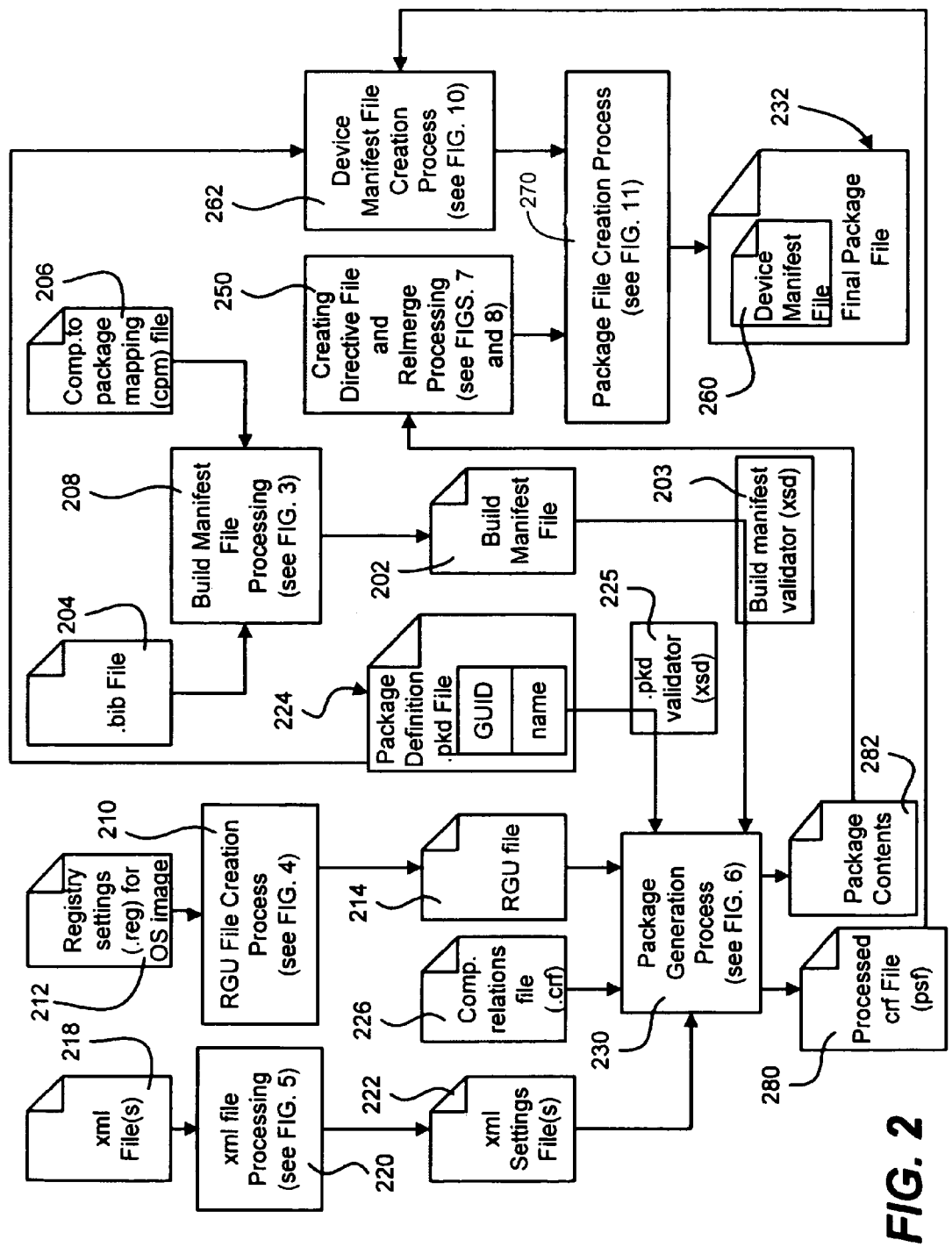
FIG. 2 is a block diagram representing various components for constructing self-describing update packages, in accordance with an aspect of the present invention.

Turning to FIG. 2 of the drawings, as part of the overall package generation process, during the build process a build manifest file 202 is created by taking a binary image builder file 204 (the .bib file, also referred to as a package manifest file) for the operating system image and a component to package mapping file 206 as inputs. As described above, the build manifest file 202 specifies the file contents for a particular package.

Figure 3:
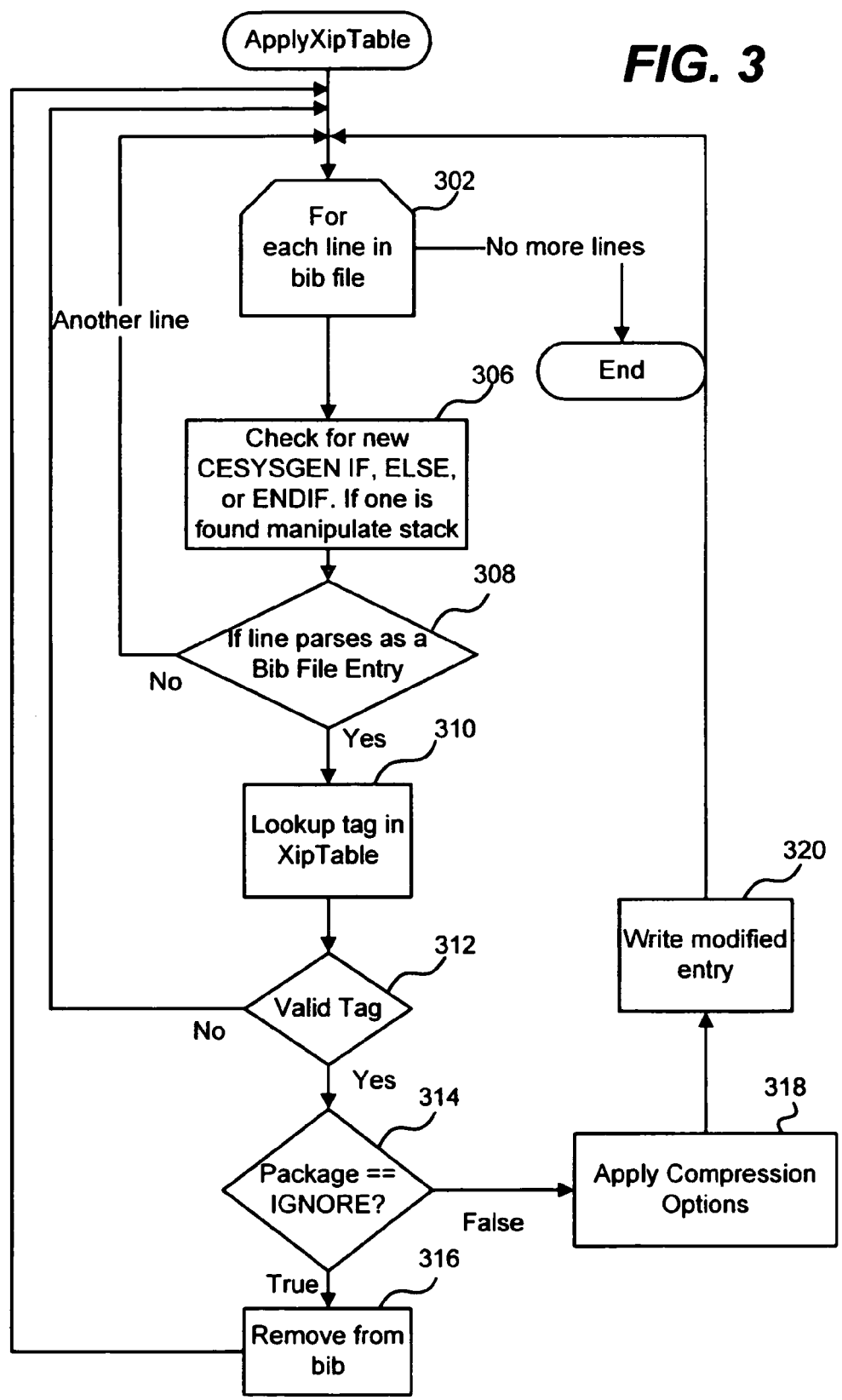
FIG. 3 is a flow diagram representing logic for creating a build manifest file from a binary image file in accordance with an aspect of the present invention.

FIG. 3 generally shows an example build manifest file creation process 208 by which the build manifest file 202 is created from the binary image builder file 204. As can be seen from FIG. 3, in general, each line in the binary image builder file 204 is parsed (steps 302, 306 and 308); lines that parse as a .bib file entry having valid tags (looked up in an execute-in-place table (steps 310 and 312) may be compressed as desired (step 318), and written to the build manifest file 202 (step 320). If the lines are to be ignored, (i.e. when decision block 314 is true) the lines are removed from the binary image file (step 316).

The resultant build manifest file 202 is an XML file that is validated with the following XSD:

```
<?xml version="1.0" encoding="utf-8" ?>
<xs:schema targetNamespace="http://tempuri.org/ManifestCollection.xsd"
elementFormDefault="qualified"
    xmlns="http://tempuri.org/ManifestCollection.xsd"
xmlns:mstns="http://tempuri.org/ManifestCollection.xsd"
    xmlns:xs="http://www.w3.org/2001/XMLSchema">
    <xs:element name="ManifestCollection">
        <xs:complexType>
            <xs:sequence>
                <xs:element name="BibFileEntry" minOccurs="1"
maxOccurs="unbounded">
                    <xs:complexType>
                        <xs:sequence>
                            <xs:element name="DeviceName"
                            type="xs:string"
minOccurs="1" maxOccurs="1" />
                            <xs:element name="ReleaseName"
                            type="xs:string"
minOccurs="1" maxOccurs="1" />
                            <xs:element name="Region"
                            type="xs:string"
minOccurs="1" maxOccurs="1" />
                            <xs:element name="Section"
                            type="xs:string"
minOccurs="1" maxOccurs="1" />
                            <xs:element name="Attribs"
                            type="xs:string"
minOccurs="0" maxOccurs="1" />
                        </xs:sequence>
                    </xs:complexType>
                </xs:element>
            </xs:sequence>
        </xs:complexType>
    </xs:element>
</xs:schema>
```

Figure 4:
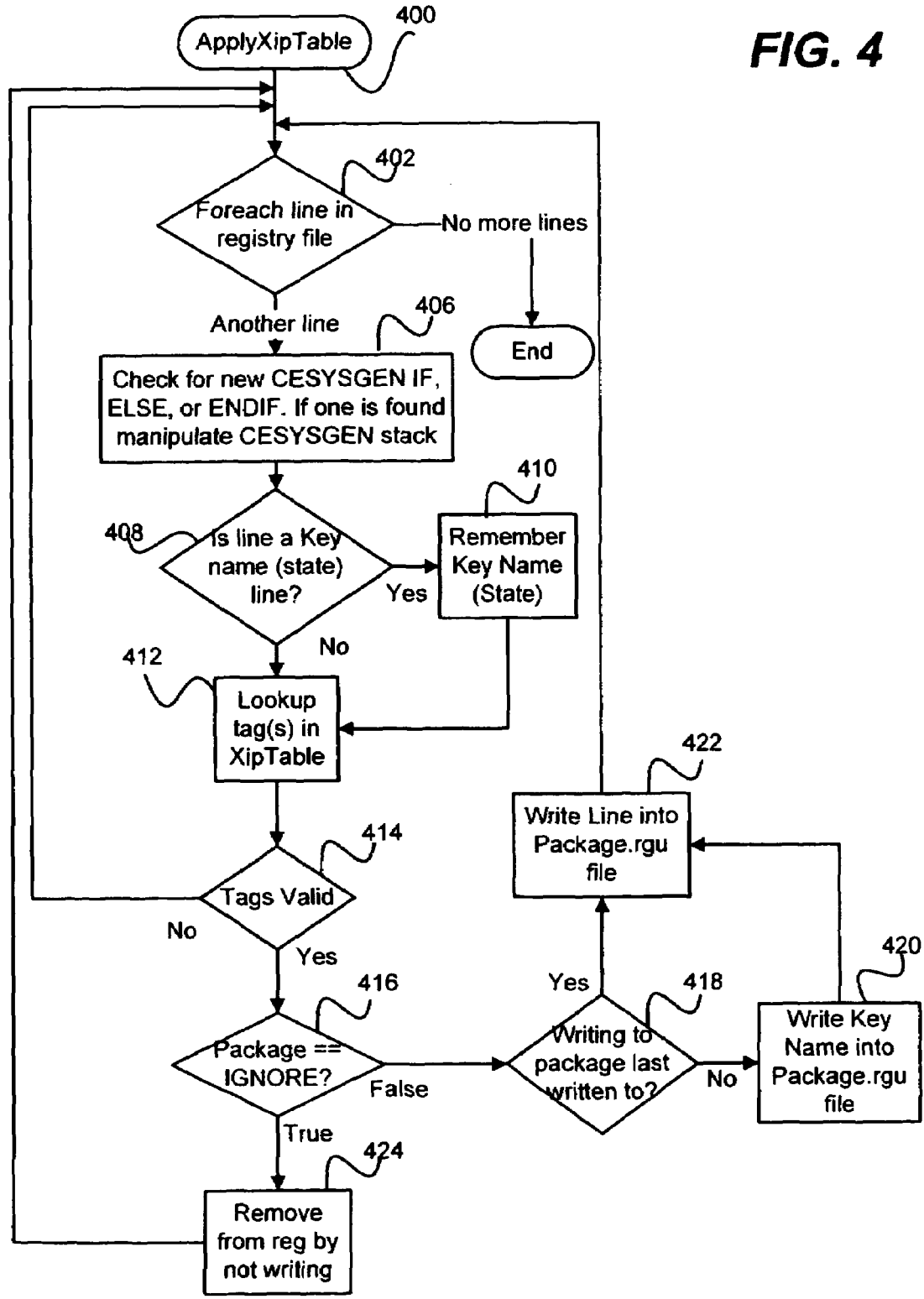
FIG. 4 is a flow diagram representing logic for creating a registry settings-related file from registry settings in accordance with an aspect of the present invention.

Similar to the way in which the build manifest file 202 was created, the registry for the operating system image is broken up (process 400, step 402) (into what is sometimes referred to as an RGU file) and assigned to packages based on a similar algorithm. An example of such a process 210 (FIG. 2) is depicted in FIG. 4, wherein the registry settings 212 (FIG. 2) associated with valid tags (step 414), including their registry key names as appropriate (as determined in steps 406, 408, 410, and 412), are written into the package RGU file (step 422). Note that the registry key names are written to that package's RGU file whenever a package being processed changes (steps 418 and 420). If the registry key names are to be ignored, (i.e. when decision block 416 is true) the registry key names are removed from the registry by not writing the names (step 316).

Figure 5:
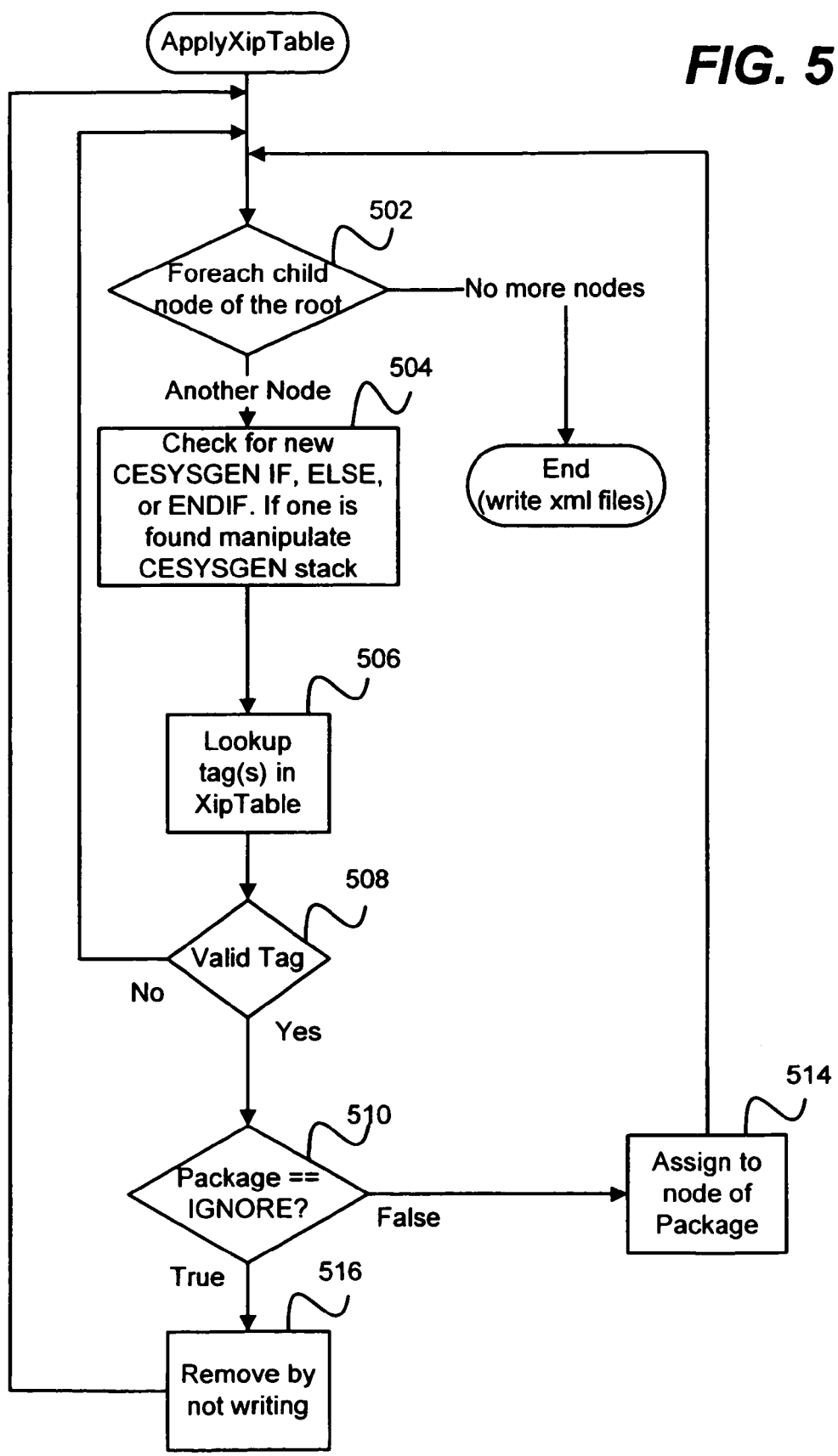
FIG. 5 is a flow diagram representing logic for processing an XML-formatted file for writing data therefrom into a package, in accordance with an aspect of the present invention.

Further, XML files 218 (FIG. 2, e.g., containing other settings) may be broken up and assigned to specific packages (e.g. in steps 502, 504 and 506). An example process 220 for doing this is depicted in FIG. 5, wherein valid tags for the children nodes (evaluated at step 508) are assigned to a node of the package (step 514). If the XML files are to be ignored, (i.e. when decision block 510 is true) the XML files are removed by not writing them (step 516).

Figure 6:
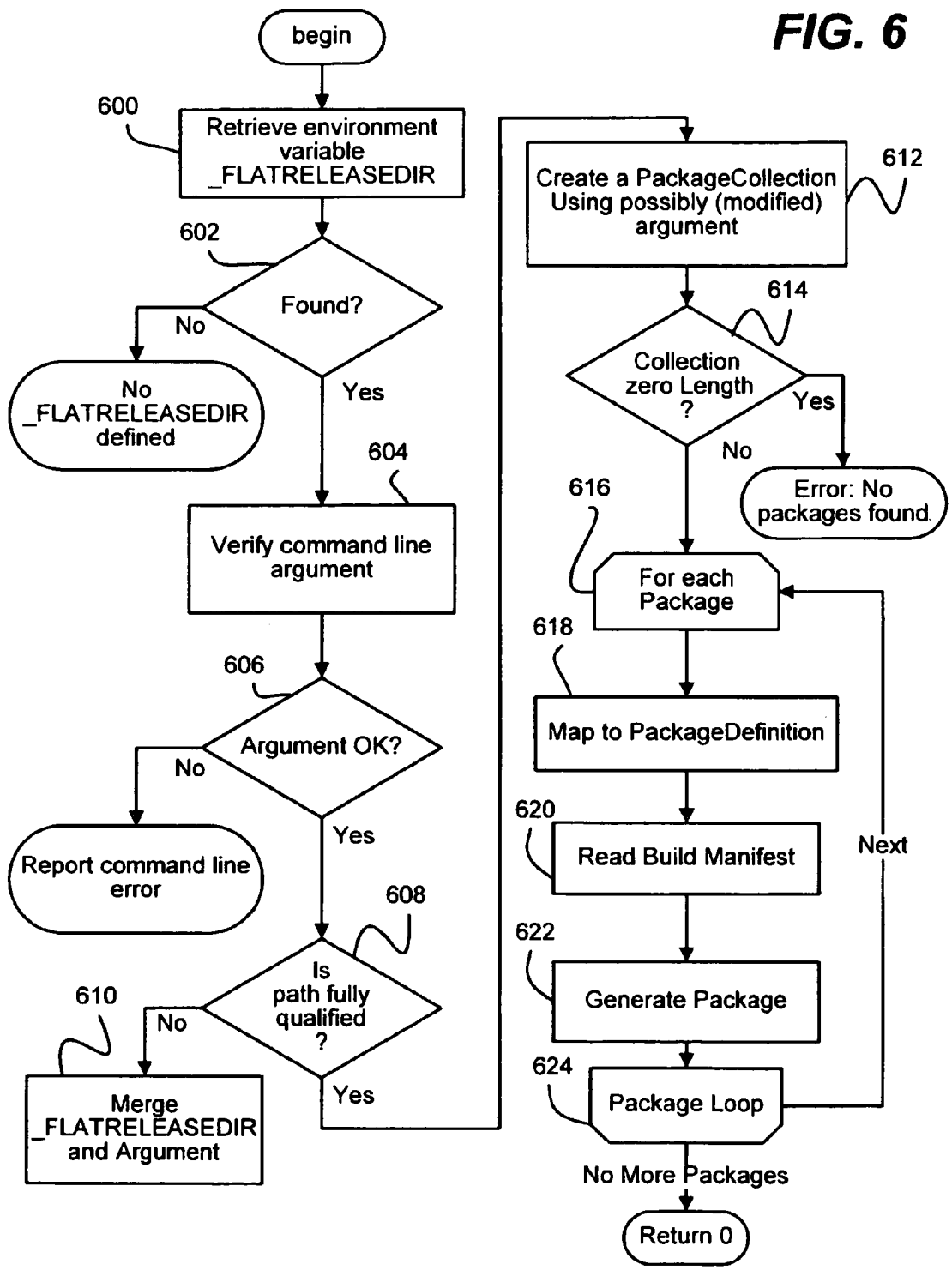
FIG. 6 is a flow diagram representing logic for generating a package, in accordance with an aspect of the present invention.

The result of this intermediate step of the package-creation process is a number of files, shown in FIG. 2, for each package that is to be constructed, including:

Package definition file (pkd) 224;
Component mapping file (cpm) 206;
Component relations file (crf) 226 OPTIONAL;
Build manifest file 202 OPTIONAL;
Registry file (rgu) 210 OPTIONAL; and
XML settings file 222; OPTIONAL From these files, (including validation, e.g., via XSD 203 and XSD 225) a package generation process 230 constructs a final package file 232, generally in accordance with the flowchart shown in FIG. 6. As generally represented in FIG. 6, after some checks and validations (steps 600-610), a package collection is created from the packages (step 612), including mapping each package 616 in package loop 624 to the package definition (where the package collection does not have a length of zero (i.e. when decision block 614 is no)), reading the build manifest file 208 for that package and generating the package from that data (steps 618-622).

Figure 7A:
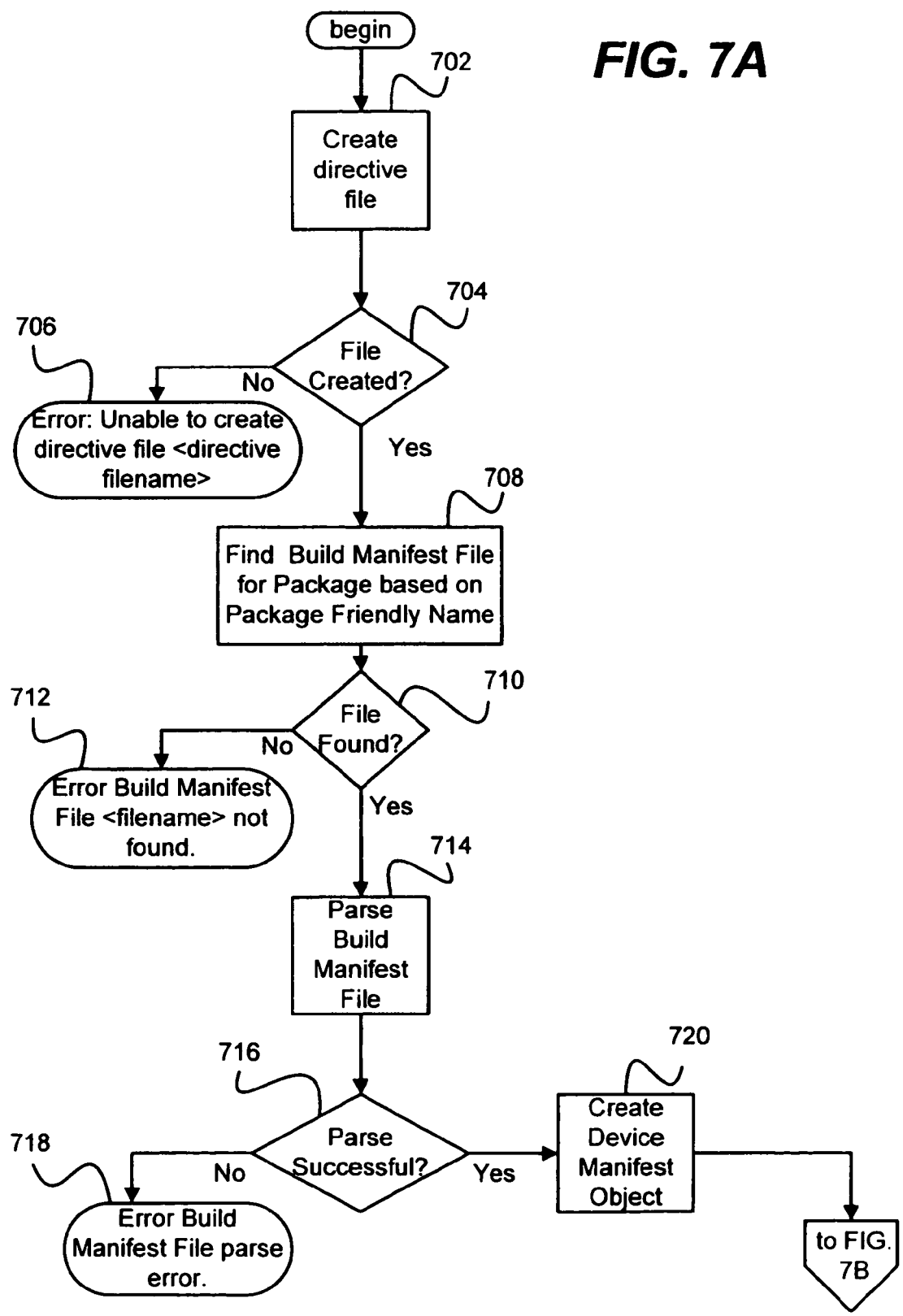
FIGS. 7A and 7B comprise a flow diagram representing logic for creating a device manifest file to describe a package, in accordance with an aspect of the present invention.
Figure 7B:
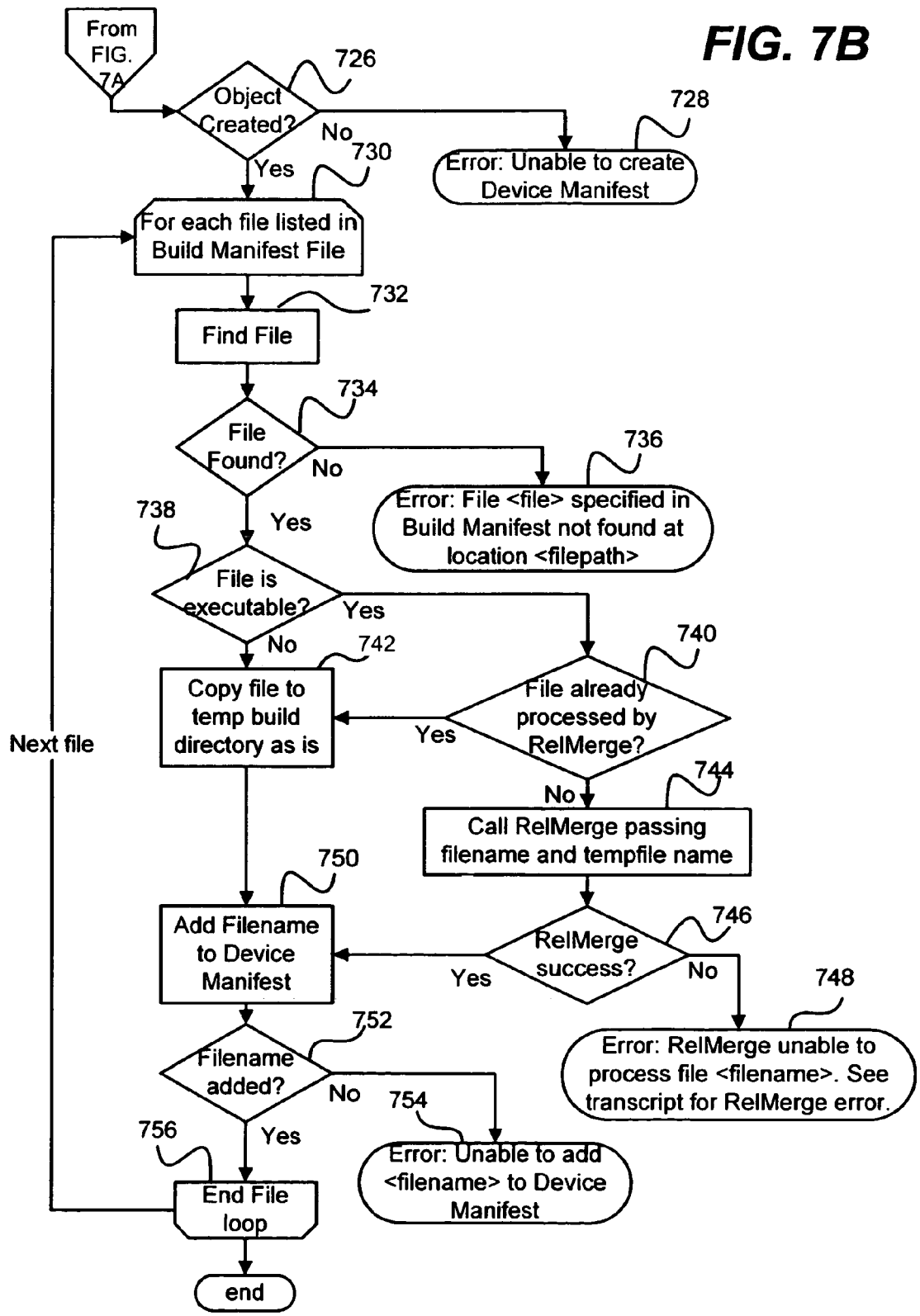

The process of converting the build manifest file into a final package file list form and processing each executable with a relmerge tool 250 (the tool that inserts relocation information into an executable as described below with reference to FIG. 8) is generally depicted in FIGS. 7A and 7B. As generally represented in FIGS. 7A and 7B via steps 700-714, a directive file is created and the build manifest file is located and parsed, (assuming no errors occurred). If the parsing is successful (step 716), a device manifest object is created at step 720, and the process continues to step 726 of FIG. 7B, which ensures that the device manifest object was properly created. If the parsing is not successful at step 716, parsing error 718 is returned.

Via steps 732 and 756, each file 730 listed in the build manifest file is processed. To this end, at step 734 the file is found and determined whether to be executable at step 738. If no object was created, error message 728 is returned. If the file was not found, error message 736 is returned. If not, the file is copied as is to a temporary build directory, (step 742), otherwise the file needs to be processed by a tool 250 (FIG. 2, e.g., named relmerge.exe) that enables executable code relocation/fix-up on the device at install time (if not already processed, as tested via step 740). If the file needs relmerge processing, described below with reference to FIGS. 8A and 8B, the tool is called at step 744, and if it executes successfully (determined in step 746), the filename is added to the device manifest (step 750). If the file does not execute successfully, error 748 is returned. If the filename was not added successfully in decision box 752, error 754 is returned.

Thus, as described above with reference to FIG. 7A and 7B, the file contents for a package, listed in the build manifest file 208, are reviewed and any executable code is processed prior to insertion into the package to enable executable code relocation/fix-up on the device at install time. To convert the build manifest file into a final package file list form, each executable is processed with the relmerge tool 250 that compresses the relocation information that is already in the file (step 816), and optionally (if a .REL file is provided) provides more detailed relocation information that allows the operating system to separate the code and data sections into discontiguous memory regions.

Figure 8:
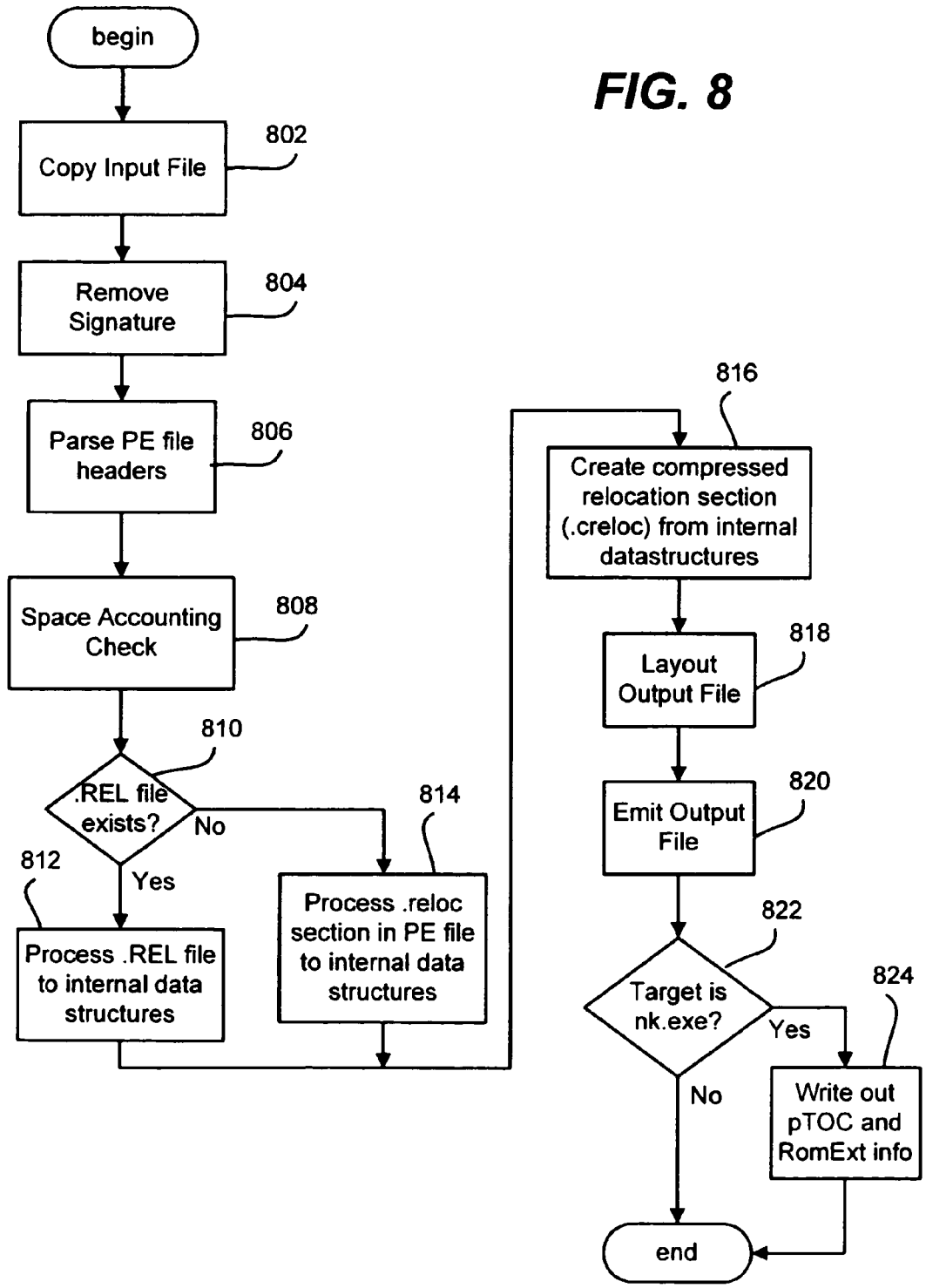
FIG. 8 is a flow diagram representing logic performed by a tool (relmerge) to insert relocation information for executable files, in accordance with an aspect of the present invention.

The relmerge tool operations are generally depicted in the flow diagram of FIG. 8. As represented by step 802, a copy of the input file is made, because the input file will be modified by running this too. The relmerge tool 250 makes a thus copy of the input file and works from that copy, which is deleted when the program exits.

At step 804, the signature is removed, because the signature would otherwise cause a later portion of the process (a space accounting check, described below) to fail. Note that since the tool 250 will be outputting a completely different file, the signature would have no relevance to the output file in any event. Note that in a portable executable file, (the file format for .EXE and .DLL files), the signature is stored at the end of the file outside of any section in the file, wherein each section corresponds to a unit with which data is loaded into memory by the loader. Each section has a header, called an 032 header, or identified with the IMAGE_SECTION_HEADER structure. As generally represented by step 806, to facilitate manipulating the file, the tool 250 parses the PE file headers for the PE file and its sections into suitable internal data structures. The IMAGE_SECTION_HEADER structure represents the image section header format (additional details about the IMAGE_SECTION_HEADER may be found at msdn.microsoft.com):

```
typedef struct _IMAGE_SECTION_HEADER {
    BYTE Name[IMAGE_SIZEOF_SHORT_NAME];
    union {
        DWORD PhysicalAddress;
        DWORD VirtualSize;
    } Misc;
    DWORD VirtualAddress;
    DWORD SizeOfRawData;
    DWORD PointerToRawData;
    DWORD PointerToRelocations;
    DWORD PointerToLinenumbers;
    WORD NumberOfRelocations;
    WORD NumberOfLinenumbers;
    DWORD Characteristics;
} IMAGE_SECTION_HEADER,
  *PIMAGE_SECTION_HEADER;
```

Because the file will be re-layed out with new headers and with padding removed, a space accounting check (step 808) is performed to verify that there is no information in the file that is not included in the sections of the file. Note that there are some situations where data is stored in an .EXE or .DLL file outside of the Sections, including file signatures and Codeview debug directory entries, (which are handled by the tool 250). There are other applications that may store data outside of a section, such as a self-extracting executable file which stores the data to be extracted after the .EXE itself. The compressed data is not stored in a section, otherwise the loader would attempt to load the compressed data into memory, which is not how a self-extracting executable should operate. The tool does not support these instances.

Space Accounting is implemented by an instance of the CSpaceAccounting class, which maintains an array of SpaceBlock structures, each of which accounts for block of data in the file. To implement Space Accounting, the areas in the file that can be accounted for are added to the SpaceAccounting as individual blocks. This is done for the file headers (including the E32 and O32 headers), and for each of the sections in the file. To accommodate CodeView debug entries, each of those are also added as a separate block. The blocks are then sorted by their offset within the file. Blocks which are adjacent in the new ordering (e.g., Block 2 begins on the byte immediately after the last byte of Block 1) are merged. At the end of the process, if all of the space in the file can be accounted for, then the list should contain one and only one block, which starts at offset 0 and has a length which is the length of the entire file. If that condition is true, then the test passes. If not, an error is reported and the tool exits.

If the space accounting check passes, the tool 250 searches for the .REL file in the same directory where the input file is specified, as represented by step 810. If so, it is processed via step 812, otherwise the relocation section of the PE file is processed via step 814. More particularly, the relocation parsing tool can parse two different types of relocation information, namely the relocation information in a .REL file, which contains destination section information, and the relocation information in the .reloc section of a PE file, which does not contain destination section information. To this end, relocation parsing has two entry points corresponding to parsing either a .REL file or the internal relocations in a PE file; in a current implementation, it is legal to call either one or the other, but not both.

In order to store the relocations, a two dimensional array of CRelocData classes is maintained, wherein the two dimensions of this array are the source section and the destination section for the relocation in question. The source section for a relocation is the section where the relocation is located, wherein a relocation is an instruction to update a particular piece of data in the file when the file is fixed up to load at a particular address; the source section identifies in which section that piece of data occurs. The source section is inferred by looking at the relative virtual address of the relocation and comparing that with the relative virtual address ranges of the sections in the file.

The destination section for a relocation identifies which section contains the piece of data to which the relocation is pointing. An inspection technique does not always work, because optimizers have been known to optimize the code in such a way that the relocations appear to point to other sections, e.g., it will optimize out an addition or subtraction and place it in the reference instead of in the code. For this reason, the destination section is not inferred from the data. The difference between the two relocation formats (.REL or .reloc) is whether the destination section for the relocation is known. The .REL file explicitly identifies the destination section, while the .reloc section does not.

As a result, for files which only have the relocation information in the .reloc section, the entire file needs to be relocated together. Without destination section information, it is not possible to separate two sections and relocate them by different amounts. Thus, this tool needs to keep track of both the source and destination section for each relocation, and keep track of whether the destination sections are valid.

To do this, the process maintains a two dimensional array of CRelocData classes, and each CRelocData class builds its own stream of relocation data. This array is fixed size in both dimensions, meaning that the tool can only handle PE files with some maximum (e.g., sixteen) sections. With that limitation, the data format for persisting the relocations stores eight bits for each of the source and destination sections, leaving the possibility in the data format for 256 sections. Two other functions (CalculateRelocSize and WriteRelocationsToFile) then combine these individual streams by writing out a block header for each combination of source and destination section which has at least one relocation.

Relocation encoding is implemented in the CRelocData class. This class takes a stream of relocation addresses (as individual calls to the CRelocData::AddReloc method), and creates a byte stream which represents the commands necessary to encode those relocations. That byte stream can be retrieved later. To implement this, the class effectively stays one command behind, always starting out with a "Single" command, representing a single relocation. Then as new relocations arrive (at the AddReloc method), they are analyzed to see if a pattern can be formed using the previous command and the new location. If the previous command is a "Single" command, the previous command can only be extended by transforming it from a "Single" command to a "Pattern" command if the new relocation address is DWORD aligned, and is within the maximum skip range of the pattern command (which is 3 DWORDs). If the previous command is a pattern command, then that pattern already has an established form, and the next element in the pattern can be deduced. If the new address happens to match the next element in that pattern, the pattern is extended by one cycle. Otherwise, a new Single command is started.

Returning to the overall flow of FIG. 8, because the sections of the file occur linearly in the file following the headers, the entire file needs to be re-layed out to accommodate the new header format and the removal of all of the padding between the sections. To this end, as represented by step 818, the old .RELOC section (if one existed) is removed, and the new .CRELOC section is added at the end, if there are any relocations to add. Using the file layout completed in step 818, the output file is finally created at step 820, writing the headers then the data for each section to the output file.

At step 822, relmerge.exe now tests to see if the target output file is nk.exe. If the output file is nk.exe, then the relmerge tool 250 processes the contents of two files, to write out the pTOC information and RomExt information (step 824), (described below). The relmerge tool 250 looks at the output file because nk.exe is created by copying different files based on debug settings. The first file processed is config.bsm.xml. This file is produced by MakePkg.exe during Image Update processing. It contains a textual representation of the names and desired values for the FIXUPVARS in the system kernel. The contents of this file are parsed and stored for later use. The second file is the map file for the input file. This file is processed by ProcessFixupVars. It takes the source file path, copies it and replaces the .exe with .map and attempts to open the map file (map files are text files containing a large amount of information about the physical and virtual addresses of functions and variables within the PE file). If the map file is successfully opened, the first line is parsed to retrieve the timestamp of the map file. The timestamp is then compared against the timestamp in the PE file. If they are different, a warning is produced and map file processing stops. If the timestamps match, each line of the file is read and a regular expression string is used to look for each FIXUPVAR. If a match is found, the address information is taken from the map file and is used to write the new variable value (from config.bsm.xml) into the source file at the correct location. At the same time, ProcessFixupVars also looks for the pTOC (where TOC represents table of contents) and RomExt variables for later processing. When pTOC is found, a new .creloc header is created with the bSrcSection set to the section retrieved from the map file (adjusted from 1 based to 0 based), the bDstSection set to 254 and a length of four. This header is written to the target file followed by the 4 byte RVA+Base address information. For RomExt, the header is the same except that bSrcSection is set to 253.

The pTOC/RomExt parsing operation is used because the operating system kernel requires information about the files in the ROMs, which is provided through the pTOC variable. This variable needs to be updated by the DiskImage tool and the update application running on the device. The information about this variable can only be retrieved through the .MAP file created during the compile and link phase of a system build. This file is parsed to retrieve this information.

Certain runtime tools need access to a variable declared within the kernel data structures. This variable is named RomExt. This variable needs to be updated by the DiskImage tool and the Update Application running on the device. The information about this variable can only be retrieved through the .MAP file created during the compile and link phase of a system build, and thus this file is parsed to retrieve this information.

Figure 9:
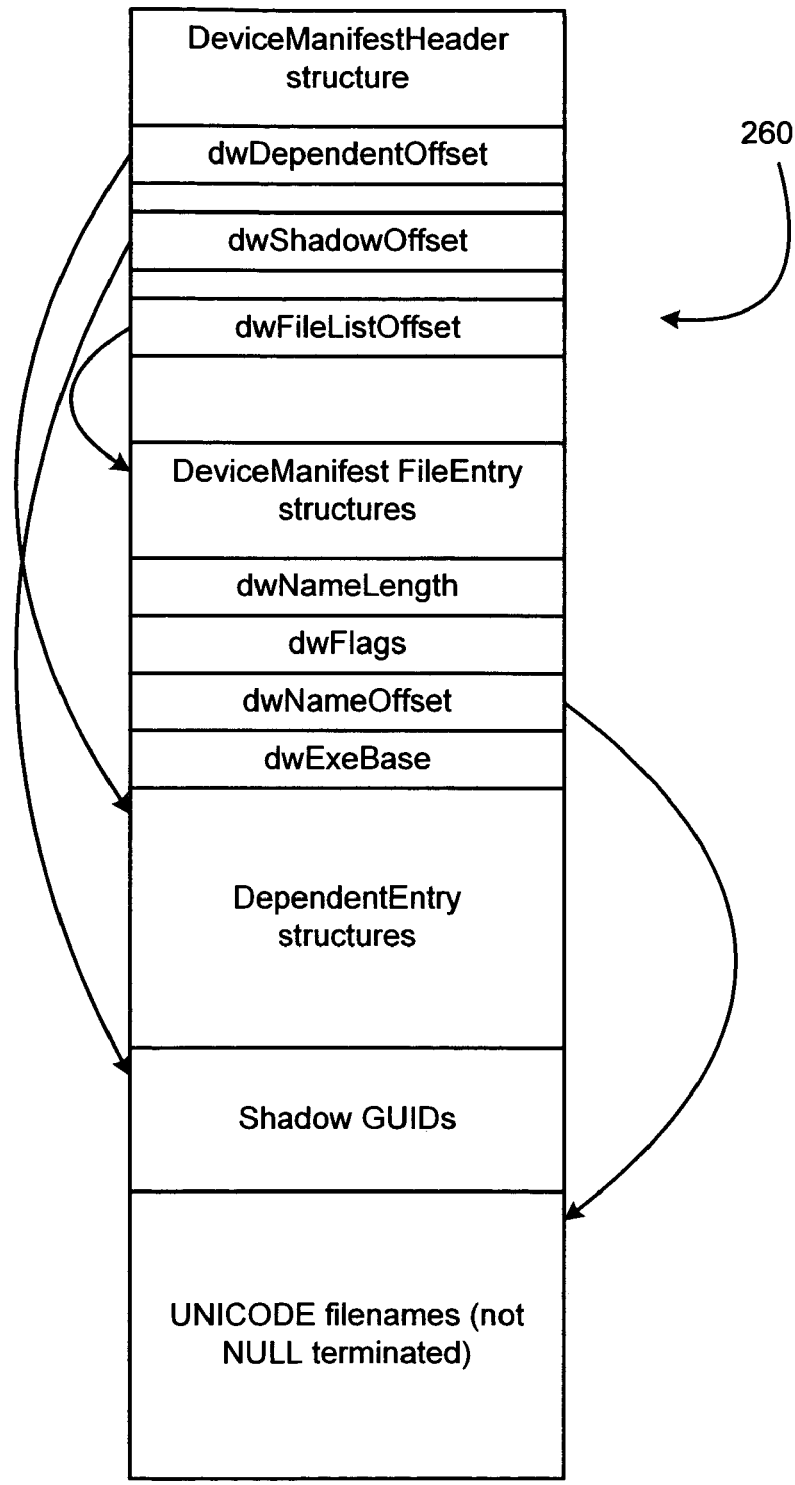
FIG. 9 is a block diagram representing the format of a device manifest file that describes a package, in accordance with an aspect of the present invention.

In accordance with an aspect of the present invention, for a package to be self-describing, a device manifest file 260 (FIG. 2, shown in more detail in FIG. 9) is created during the packaging process and stored in the package itself. The device manifest file 260 is used during the installation process. The format and information contained in the device manifest file is shown in FIG. 9 and is also described with this structure definition:

```
typedef struct __DeviceManifestHeader
{
    const DWORD dwStructSize;         // Size of this structure (in bytes)
                                      // for versioning
    const DWORD dwPackageVersion;     // Version of this package
    const DWORD dwPrevPkgVersion;     // Version of package that this package
                                      // updates. (0) for Canonical
    const DWORD dwPackageFlags;       // package specific identifiers.
    const DWORD dwProcessorID;        // what processor (matches defines in
                                      // winnt.h)
    const DWORD dwOSVersion;          // what version of the operating system
                                      // was this built to.
    const DWORD dwPlatformID;         // what was the target platform.
    const DWORD dwNameLength;         // length of filename in bytes.
    const DWORD dwNameOffset;         // offset to Friendly name of package
    const DWORD dwDependentCount;     // How many entries in Dependent GUID
                                      // list.
    const DWORD dwDependentOffset;    // How many bytes from the front of the
                                      // file are the dependent GUID structs.
    const DWORD dwShadowCount;        // How many entries in shadow GUID list.
    const DWORD dwShadowOffset;       // How many bytes from front of file is
                                      // the array of shadowed package GUIDs.
    const DWORD dwFileCount;          // How many files are there listed in
                                      // this manifest.
```

```
        const DWORD dwFileListOffset;      // How many bytes from the front of file
                                           // to the first FileEntry.
        const DWORD cbCERTData;            // number of bytes of digital
certificate
                                           // data
        const DWORD dwCERTDataOffset;      // How many bytes from the front of file
                                           // to the certificate data.
        const GUID guidPackage;            // GUID of this package
}DeviceManifestHeader, *PDeviceManifestHeader;
typedef struct _DependentEntry {
        const DWORD size;
        const DWORD version;
        const GUID guid;
}DependentEntry, *PDependentEntry;
typedef struct _FileEntry {
        const DWORD dwNameLength;
        const DWORD dwFlags;
        const DWORD dwOffset;
        const DWORD dwBase; // Base address that file was originally linked with
        const DWORD dwFileSize; // Size of the whole file. Not accurate for
                                // update packages.
}FILEENTRY, *PFILEENTRY;
```

In one implementation, as described above, the contents of a device manifest file are derived from the pkd and processed crf file (called a psf file 280 once processed) information, as well as from the build manifest file (e.g., for the file list and attribute information). The crf file describes component-level dependencies, and is processed into a form that describes package-level dependencies.

Further, component settings (configuration information) can shadow one-another (in other words, there is a precedence ordering in events where two related settings exist on the system such that only one will win). Dependency and shadowing information at the component level are converted into package-level relations by way of a shadow order tool.

The shadow order tool produces a package shadow file (packagename.psf) for each package which shadows other packages according to the component relationships file 226 (FIG. 2). The .psf file for a package lists (one per line) the GUIDs of shadowed packages. The shadow order tool's inputs are the merged component to package mapping file (.cpm), the merged component relationships file (.crf) and the merged package definition file (.pkd). The output is a text file, including formatted text lines of the form:

<shadowed pkg GUID>, <shadowed pkg name>, <rule> (where rule=SHADOWS or DEPENDSON).

An example line is shown below:

273ce4bf-d4ef-4771-b2ce-6fe2fa2b2666,SMARTFON, SHADOWS

Figure 10A:
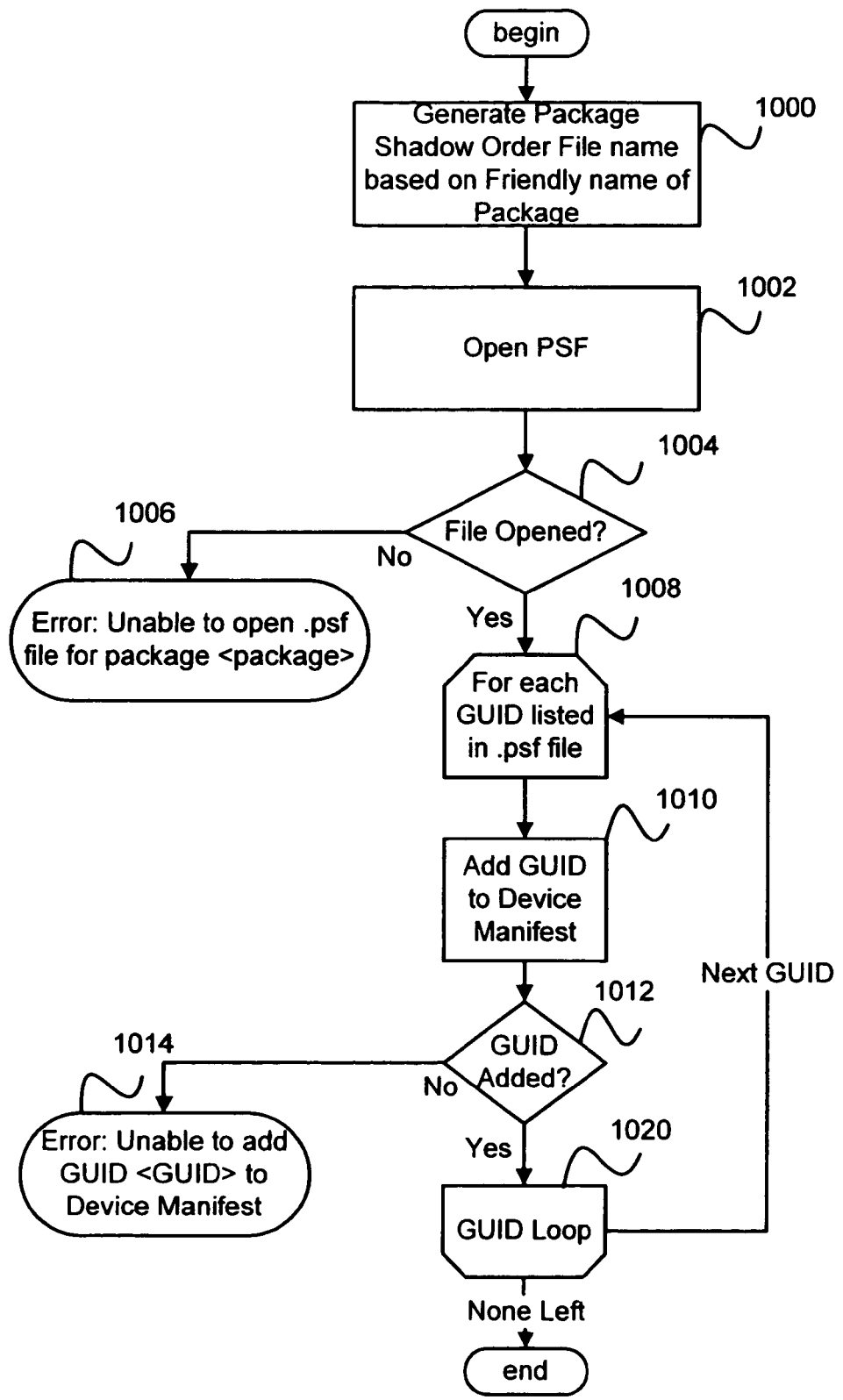
FIGS. 10A and 10B comprise flow diagrams for building a device manifest file to describe a package, in accordance with an aspect of the present invention.
Figure 10B:
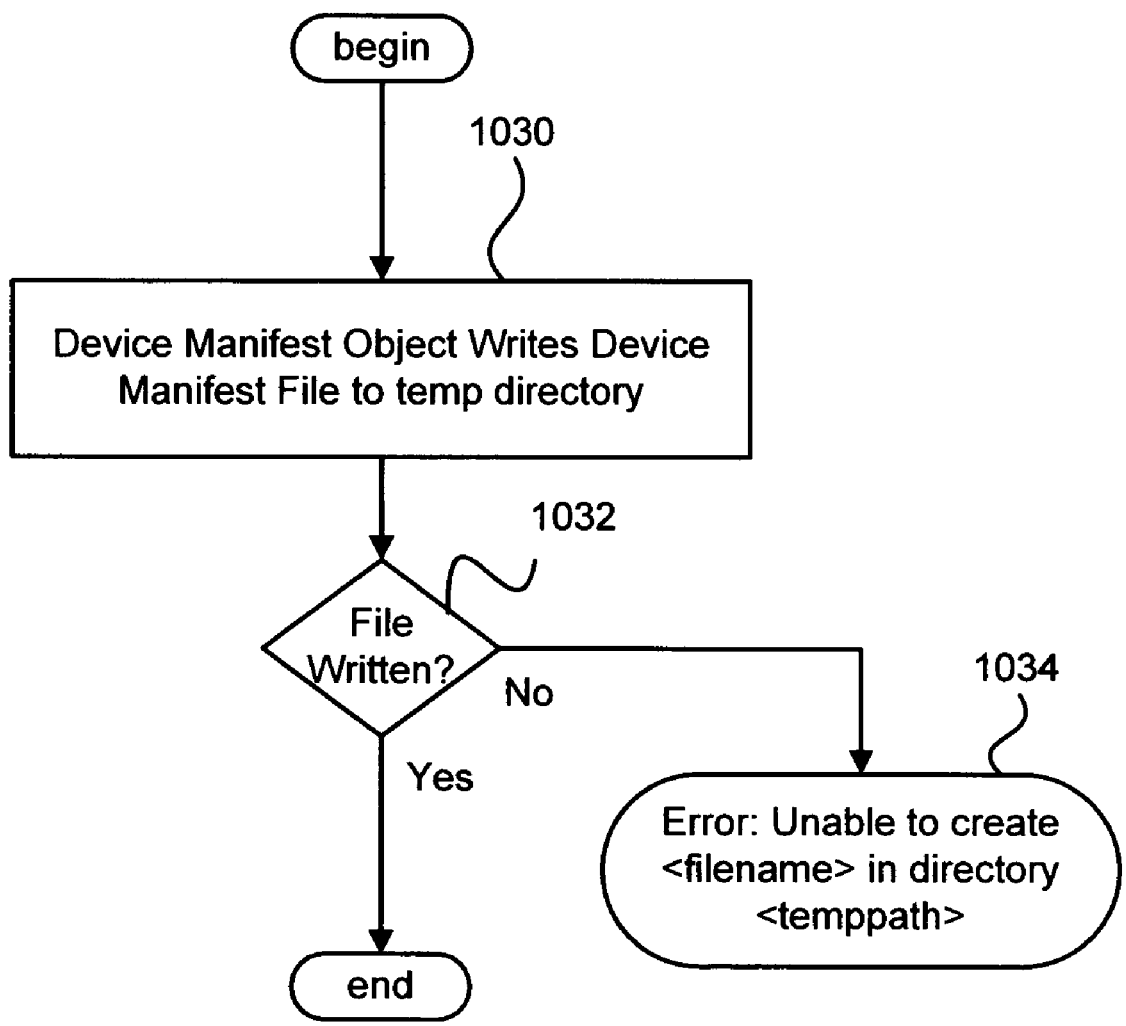

From this information, the package generator creates a device manifest file (as described in steps 1000-1008), as shown in FIG. 2 by a Device Manifest File Creation Process 262 and as generally described in FIGS. 10A and 10B. To this end, each GUID in the .psf file is added to the device manifest file, as generally represented via step 1010 of FIG. 10A. Note that in one implementation, this includes determining if the GUID is a dependency GUID or a shadow GUID, and calling the appropriate add function on the device manifest object. When the GUIDS have been added (decision box 1012), the device manifest object writes the device manifest file to the temporary directory, as generally represented via step 1030 of FIG. 10B. The process repeats as indicated by GUID loop 1020. If no GUID was added, error message 1014 is returned. If the file is not written (as indicated in decision box 1032), error message 1034 is returned.

Figure 11:
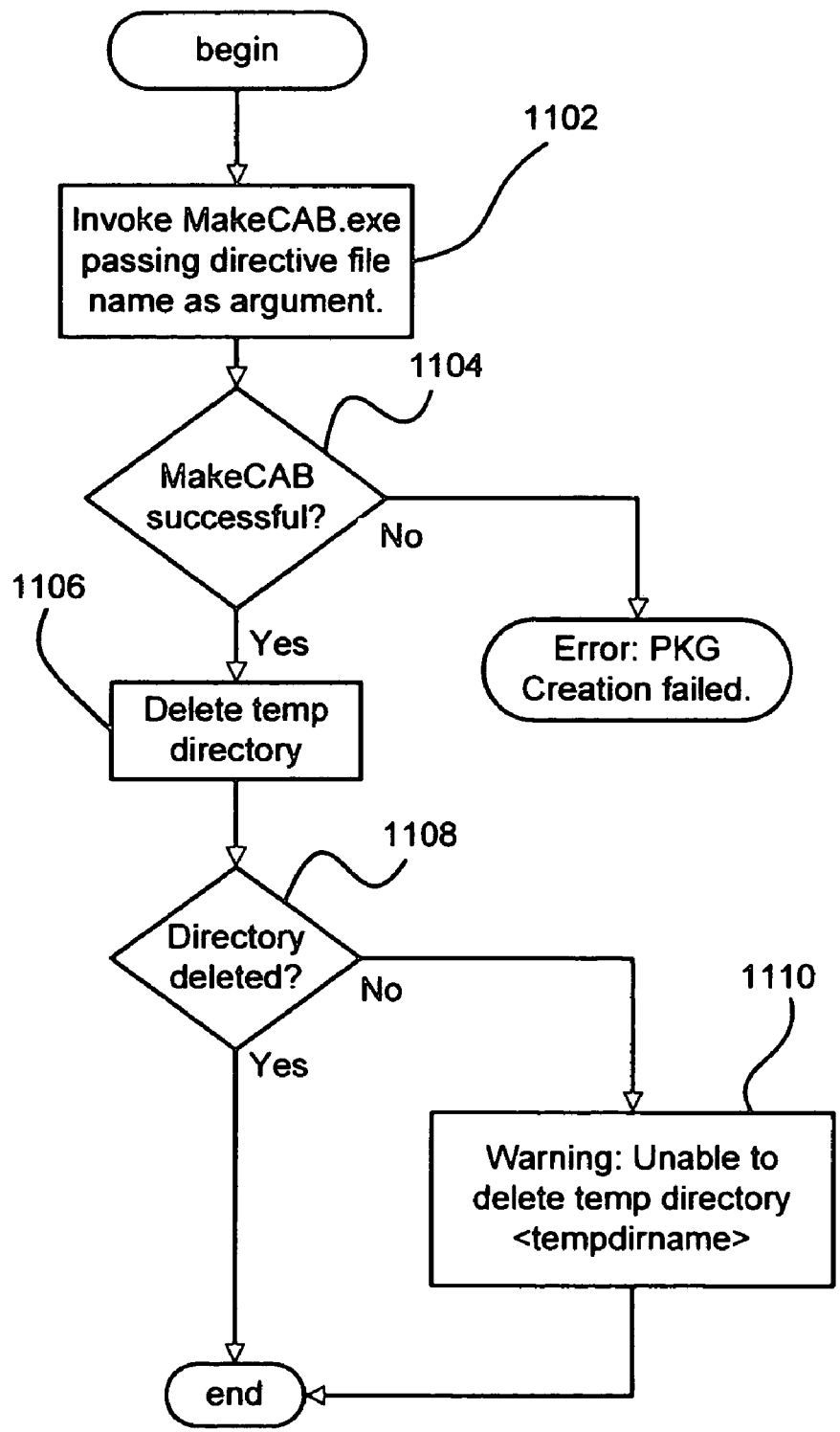
FIG. 11 is a flow diagram representing the creation of a package, in accordance with an aspect of the present invention.

As described in FIG. 11, the package file 232 is created (see package file creation process 270), including the processed files described in the directive file, the rgu file(s) 214, the xml file(s) 218, and the device manifest file 260, along with other package contents 282, using a package file creation process such as a CAB file API (CABAPI) described in steps 1102-1110. The CABAPI is intended to provide access to the contents of Cabinet files that are used as the transport mechanism for the files involved in an image update as part of the image update process.

To create the package, a PackageDefinition class is responsible for managing the overall creation of a Package. As part of the creation process, the PackageDefinition object creates a new subdirectory under the directory specified by the '_FLATRELEASEDIR' environment variable. The directory name is the package name, with the string "_PACKAGE_FILES" appended thereto, e.g., given a package named—"LANG"—, a directory named "LANG_PACKAGE_FILES" would be created. This directory is created when the method SetDirectoryBase is called on the object. When the PackageDefinition object creates a package, the name of the resulting package file is the friendly name of the package with a ".PKG" extension. The package file conforms to the Microsoft CAB file specification for CAB version 1.3.

The PackagDefinition class provides the following public methods:

PackageDefinition(XipPackage pkg)—Constructor to create a package based on an XipPackage object.

SetDirectoryBase(string path)—Creates a new subdirectory under the specified directory.

Validate( )—Determines if the package has the two required fields, a name and a GUID.

ReadManifest( )—Causes the BuildManifest associated with this package to parse the appropriate build manifest file.

MakePackage( )—Creates the actual package file for this package definition.

Further, when working with the various files for inclusion in the packages, it should be noted that executable code and data may be arranged in separate files. One significant advantage of is to facilitate a multi-language system, where the language-specific parts of a feature are placed into separate packages that are language specific. This creates a system where the packages that contain the executable code of the system are separate from the packages that contain language-specific components of the system. As a result, a patch for the executable code of a feature may be applied to any device, independent of any combination of languages that are installed on a that device.

More particularly, by construction, when a feature is built, the executable code (and language-independent data) are separated into one set of files, and the language-dependent data (and potentially code) into another set of files. These files are tagged as being part of the feature, but the language-dependent data files are further tagged being as language dependent. The system then moves those files into a separate package (e.g., described by a LocBuddy tag in the pkd file).

By way of example, a telephone-based feature may be in a library (e.g., tpcutil.dll) that is language-independent. The language-dependent resources for the phone feature are built into another resource dll, e.g., named tapres.dll, which is further localized for each language, e.g., it becomes tapres.dll.0409.mui (for US English), tapres.dll.0407.mui (for German), and so forth. These files are tagged as being part of the phone feature, but the language-specific files are further tagged as being language-specific, with suitable filenames. For example, filenames may be constructed by substituting suitable language tags into a location-based variable in the name, such as represented by tapres.dll.%LOCID%.mui. Then the file is processed for each language that is supported, and multiple LANGPHONE (the locbuddy) packages are generated, e.g., LANGPHONE_0409 (for US English), LANGPHONE_0407 (for German), and so forth. As a result, the system can later update the LANGPHONE region such as to fix bugs in tpcutil.dll, independent of which languages are installed on the phone (via different LANGPHONE_xxxx packages).

Additionally, the flexibility of the system is such that language-specific executable code is allowed where necessary. For example, different languages and locales have different Input Method Editors (IMEs) which are used for capturing text in that language. These IMEs require special code for each language, and thus are placed inside one of the LANG regions.

Lastly, note that cabinet verification may be performed. The cabinet verification module extracts the device manifest file 260 from the final package file 232 (a cabinet file) and verifying the cabinet file against the contents of the device manifest 260.

As can be seen from the foregoing detailed description, there is provided various mechanisms that that facilitate the updating of some subset of an operating system image. A self-describing package file is provided, including dependency, shadow and other features that make updating of an image straightforward and correct.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a mobile computing system comprising a software image that includes operating system files and other associated software application files, a method for updating a portion of the files in the software image, the software image being stored in embedded system memory, the method comprising:

building a self-describing package, the package corresponding to part of an operating system image and containing files and registry settings, the package comprising a package manifest file that describes the binary structure of the image into which the package will be incorporated, the package including at least some language-independent executable code files configured for processing in any language that are separate from language-dependent data files, such that at least some of the executable code is independent of language-specific processing;

generating a build manifest file that specifies the file contents for the self-describing package;

generating a device manifest file that describes a set of information about the package including dependency and package settings priority information for the mobile computing system, the device manifest file being stored in the self-describing package and being configured to receive list and attribute information from the build manifest;

inserting one or more feature handles into the generated device manifest file, the feature handles specifying one or more software features that are to be included in the package such that those individual files, registry settings and libraries comprising the software features that are mapped with this feature are automatically included in the device manifest file, wherein individual feature mapping is omitted;

associating information in the package manifest file, the build manifest file and the device manifest file, including the inserted feature handles, with the self-describing package that describes the contents of the package such that an installation mechanism can determine how to install the package to a device; and installing the files of the self-describing package according to the corresponding manifest files, wherein only those files identified in the self-describing package are overwritten in the software image.

2. The method of claim 1 wherein the information associated with the package comprises a device manifest file, and further comprising, adding the device manifest file to the package.

3. The method of claim 2 further comprising writing data into the device manifest file comprising dependency information that describes a dependency of at least some contents of the package on another entity.

4. The method of claim 3 wherein the other entity comprises another package, and further comprising extracting the device manifest file from the package and extracting another device manifest file from the other package.

5. The method of claim 2 further comprising writing data into the device manifest file comprising shadow information that describes precedence of settings data relative to other settings data.

6. The method of claim 1 wherein building a package comprises, determining which files are executable files and performing a relocation process on the executable files.

7. The method of claim 1 wherein associating information with the package that describes the contents of the package comprises associating dependency information that describes a dependency of at least some contents of the package on another entity.

8. The method of claim 1 wherein associating information with the package that describes the contents of the package comprises associating shadow information that describes precedence of settings data relative to other settings data.

9. The method of claim 1 wherein building a package comprises mapping a package to a definition for that package that defines existing files, reading a build manifest file that specifies the file contents for that package, and generating the package based on the package definition and the build manifest file.

10. The method of claim 9 further comprising creating the build manifest file from a binary image builder file for the operating system image and a component to package mapping file.

11. The method of claim 10 further comprising processing executable code identified in the build manifest file, to enable executable code relocation at install time to a device.

12. The method of claim 1 wherein building the package comprises reading a binary image builder file that contains a list of files to be included in the package when built.

13. The method of claim 1 wherein building the package comprises creating a build manifest file corresponding to the binary image builder file and reading the build manifest file.

14. The method of claim 1 wherein building the package comprises reading a settings file that contains a list of setting information to be included in the package when built.

15. The method of claim 1 wherein building the package comprises reading a component mapping file that maps module-related information and files to the package.

16. The method of claim 1 wherein building the package comprises reading a component relationships file that defines shadow relationships.

17. The method of claim 16 wherein the information associated with the package comprises a device manifest file, and further comprising, writing information to the device manifest file based on the shadow relationships, and adding the device manifest file to the package.

18. The method of claim 1 wherein building the package comprises reading a component relationships file that defines dependency relationships.

19. The method of claim 16 wherein the information associated with the package comprises a device manifest file, and further comprising, writing information to the device manifest file based on the dependency relationships, and adding the device manifest file to the package.

20. The method of claim 1 wherein building the package comprises reading a package definition file that defines what packages exist.

21. At least one computer-readable storage media having computer-executable instruction which when executed perform the method of claim 1.

22. In a mobile computing system comprising a software image that includes operating system files and other associated software application files, a system for updating a portion of the files in the software image, the software image being stored in embedded system memory, the system comprising:

a system memory;

a package generation process that builds a self-describing package containing files and registry settings, the package comprising a package manifest file that describes the binary structure of the image into which the package will be incorporated, the package including at least some language-independent executable code files configured for processing in any language that are separate from language-dependent data files, such that at least some of the executable code is independent of language-specific processing;

a build manifest file generation process that generates a build manifest file that specifies the file contents for the self-describing package;

a device manifest file generation process that generates a device manifest file that describes a set of information about the package including dependency and package settings priority information for the mobile computing system, the device manifest file being stored in the self-describing package and being configured to receive list and attribute information, from the build manifest;

a feature handle inserting process that inserts one or more feature handles into the generated device manifest file, the feature handles specifying one or more software features that are to be included in the package such that those individual files, registry settings and libraries comprising the software features that are mapped with this feature are automatically included in the device manifest file, wherein individual feature mapping is omitted;

a package associating process that associates information in the package manifest file, the build manifest file and the device manifest file, including the inserted feature handles, with the self-describing package to describe the contents of the package, the information including component relationship information; and an installation process that installs the files of the self-describing package according to the corresponding manifest files, wherein only those files identified in the self-describing package are overwritten in the software image.

23. The system of claim 22 wherein the component relationship information describes a dependency on another entity.

24. The system of claim 23 wherein the other entity is another package.

25. The system of claim 22 wherein the component relationship information describes a shadow relationship with another entity.

26. The system of claim 25 wherein the other entity is another package.

27. The system of claim 22 wherein the package generation process determines which files are executable files and performs a relocation process on the executable files.

28. The system of claim 22 wherein the package generation process allows a distinction between at least some executable code and data such that at least some of the executable code is independent of any language.

* * * * *